(12) United States Patent  
Tanaka

(10) Patent No.: US 8,302,295 B2  
(45) Date of Patent: Nov. 6, 2012

(54) VERY THIN COAXIAL CABLE END PROCESSING METHOD

(75) Inventor: Kotaro Tanaka, Naka (JP)

(73) Assignee: Hitachi Cable, Ltd., Tokyo (JP)

( * ) Notice: Subject to any disclaimer, the term of this patent is extended or adjusted under 35 U.S.C. 154(b) by 389 days.

(21) Appl. No.: 12/461,648

(22) Filed: Aug. 19, 2009

(65) Prior Publication Data

US 2010/0282487 A1    Nov. 11, 2010

(30) Foreign Application Priority Data

May 7, 2009    (JP) ................................ 2009-112892

(51) Int. Cl.  
*H02G 1/12* (2006.01)

(52) U.S. Cl. .......................................................... 29/828

(58) Field of Classification Search ................... 29/829, 29/828

See application file for complete search history.

(56) References Cited

U.S. PATENT DOCUMENTS 3,267,774 A * 8/1966 Bilco et al. ................... 81/9.51

FOREIGN PATENT DOCUMENTS

| JP | 2007-20342 | 1/2007 |
| JP | 2007-290013 | 11/2007 |
| WO | WO 2007/125677 A1 | 11/2007 |

* cited by examiner

*Primary Examiner* — Livius R Cazan  
(74) *Attorney, Agent, or Firm* — McGinn IP Law Group, PLLC

(57) ABSTRACT

A method for processing an end of a very thin coaxial cable which includes sequentially from its center to outer side a center conductor, an inner insulator, a shield conductor formed of a helically wound or a braided conducting wire, and a jacket. The method includes cutting the jacket to expose the shield conductor, cutting a circumferential portion of the exposed shield conductor in plural longitudinal portions of the very thin coaxial cable, and pulling and removing the jacket and the shield conductor between the end of the very thin coaxial cable and a farthest end-processing portion from the end of the very thin coaxial cable, to expose the inner insulator.

8 Claims, 5 Drawing Sheets

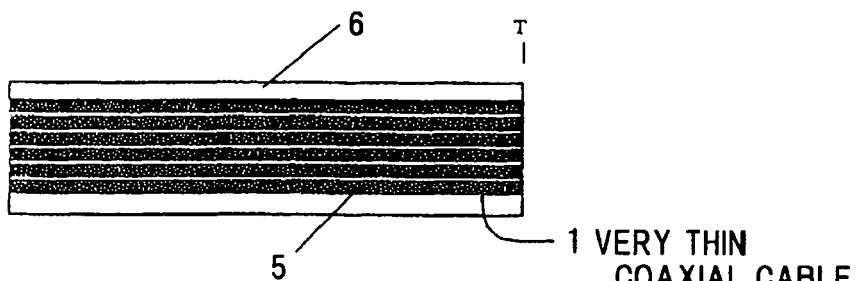
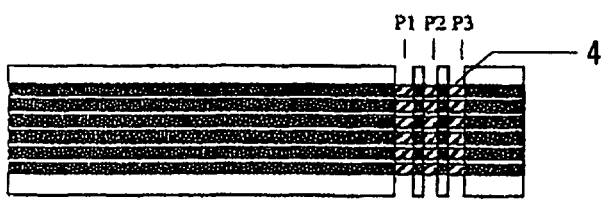
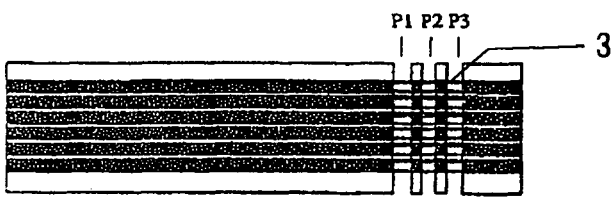
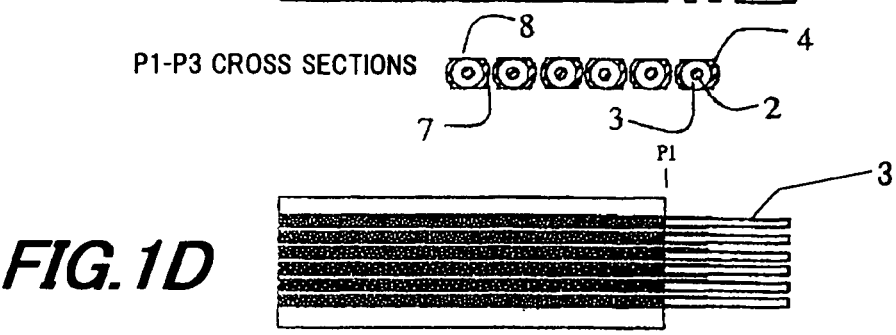
FIG. 1A
FIG. 1B
FIG. 1C
FIG. 1D
2 CENTER CONDUCTOR
3 INNER INSULATOR
4 SHIELD CONDUCTOR
5 JACKET
6 ADHESIVE TAPE
7 SHIELD CONDUCTOR
8 LASER APPLIED SURFACE

2 CENTER CONDUCTOR
3 INNER INSULATOR
4 SHIELD CONDUCTOR
5 JACKET
6 ADHESIVE TAPE

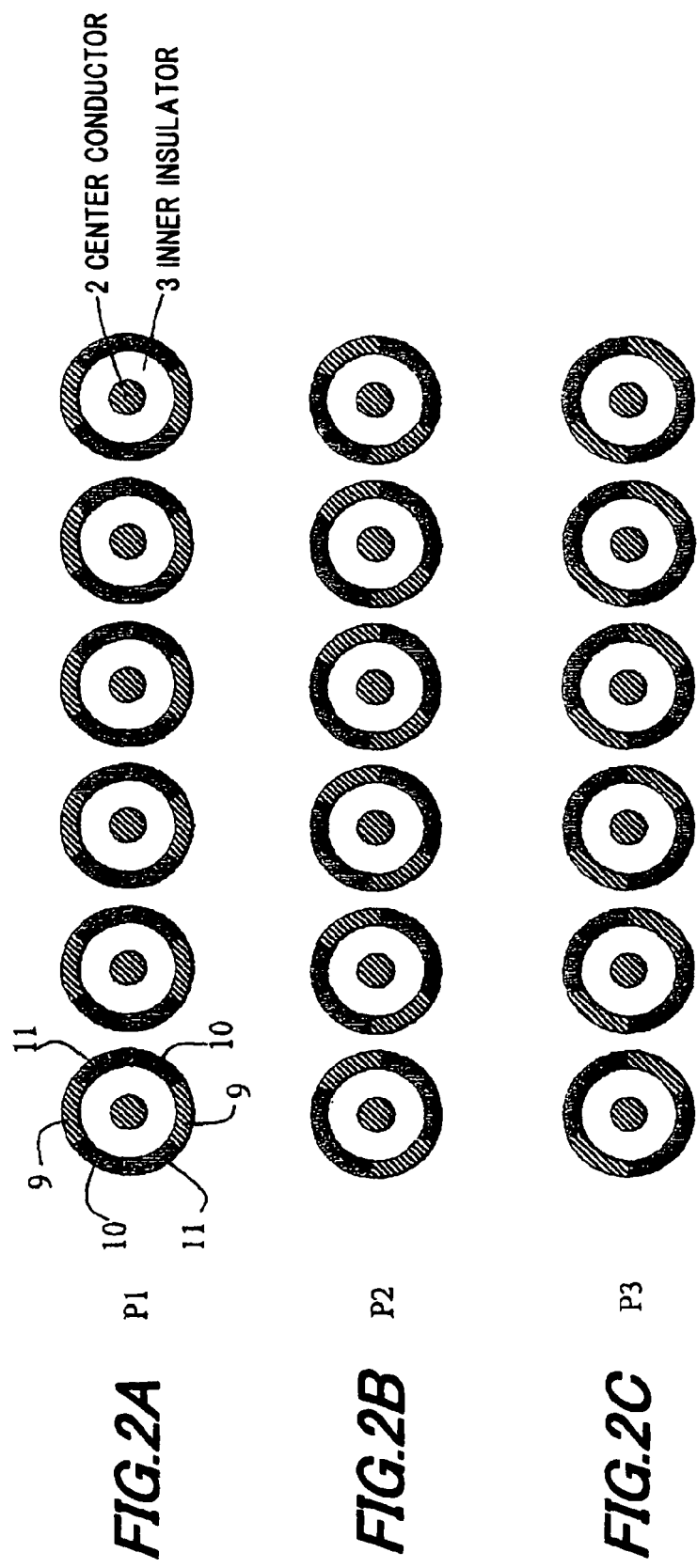

VERY THIN COAXIAL CABLE END PROCESSING METHOD

The present application is based on Japanese patent application No. 2009-112892 filed on May 7, 2009, the entire contents of which are incorporated herein by reference.

BACKGROUND OF THE INVENTION

1. Field of the Invention

The present invention relates to a very thin coaxial cable end-processing method and end-processed structure, which, when cutting a shield conductor, reduces damage to an inner insulator thereof.

2. Description of the Related Art

A very thin coaxial cable is used as a high-frequency/high-speed signal transmission and large-flexibility cable, such as a cable for connecting a notebook PC and a liquid crystal display, a cable for connecting a medical ultrasonograph body and a probe, etc.

The very thin coaxial cable has sequentially stacked from its center to outer side a center conductor, an inner insulator, a shield conductor, and a jacket. When connecting the very thin coaxial cable directly to a device, or attaching to a connector, an end of the very thin coaxial cable is processed to expose its center conductor and shield conductor at the end.

FIGS. 5A-5D show a conventional process for processing an end of plural very thin coaxial cables.

Referring to FIG. 5A, plural very thin coaxial cables 1 are arrayed at a desired array pitch, and in that arrayed state, fixed with an adhesive tape 6.

Referring to FIG. 5B, by applying laser light, the adhesive tape 6 and jacket 5 of the very thin coaxial cables 1 are cut in a processing portion at a desired distance from an end, and the adhesive tape 6 and jacket 5 at the end are pulled together and removed from the processing portion. This causes shield conductors 4 to be exposed from this processing portion to the end. The cut refers to making a cut therein.

Referring to FIG. 5C, by applying laser light, the shield conductors 4 are cut in a processing portion nearer the end than the processing portion of FIG. 5B, and the shield conductors 4 at the end are pulled in the end direction and removed from this processing portion. This causes inner insulators 3 to be exposed from this processing portion to the end.

Referring to FIG. 5D, by applying laser light, the inner insulators 3 are cut in a processing portion nearer the end than the processing portion of FIG. 5C, and the inner insulators 3 at the end are pulled in the end direction and removed from this processing portion. This causes center conductors 2 to be exposed from this processing portion to the end.

Performing the above process results in the shield conductor 4, inner insulator 3 and center conductor 2 being exposed at the desired lengths, respectively.

Refer to JP-A-2007-290013 and JP-A-2007-20342, for example.

However, when applying laser light to the shield conductor 4 to cut the shield conductor 4, the conventional end-processing method causes the laser light to reach the inner insulator 3 after cutting the shield conductor 4, leading to laser light energy absorption into the inner insulator 3, and therefore damage to the inner insulator 3.

The method by JP-A-2007-290013 is designed to apply plural laser light rays by varying their optical axis angles, to give laser power uniformly to the entire shield conductor wrapped around the inner insulator. However, this causes the problem that when cutting an outer conductor of one of plural coaxial cables arrayed, a laser optical axis may be blocked by coaxial cables on both its sides, therefore rendering it impossible to configure the cables at a narrow array pitch.

The method by JP-A-2007-20342 shifts focus position of laser light in a perpendicular direction to the laser-applying direction, thereby reducing the thermal effect on the inner insulator. General processing lasers have large enough focus depth relative to very thin coaxial cable diameter, to have little practical effect of reducing the thermal effect even by perpendicularly shifting focus position of laser light by the order of not more than the very thin coaxial cable diameter. The thermal effect is inevitable.

SUMMARY OF THE INVENTION

Accordingly, it is an object of the present invention to provide a very thin coaxial cable end-processing method and end-processed structure, which obviates the foregoing problems, and which, when cutting a shield conductor, reduces damage to an inner insulator thereof.

(1) According to an embodiment of the invention, a method for processing an end of a very thin coaxial cable comprising sequentially from its center to outer side a center conductor, an inner insulator, a shield conductor formed of a helically wound or a braided conducting wire, and a jacket, comprising:

cutting the jacket to expose the shield conductor;

cutting a circumferential portion of the exposed shield conductor in plural longitudinal portions of the very thin coaxial cable; and pulling and removing the jacket and the shield conductor between the end of the very thin coaxial cable and a farthest end-processing portion from the end of the very thin coaxial cable, to expose the inner insulator.

In the above embodiment (1), the following modifications and changes can be made.

(i) The shield conductor is cut on both upper and lower surfaces of the very thin coaxial cable at $1/(2 \times n)$ a helical or braid pitch of the shield conductor, where n is an integer and $n \geq 2$.

(ii) The shield conductor is cut on one surface of the very thin coaxial cable at $1/m$ a helical or braid pitch of the shield conductor, where m is an integer and $m \geq 2$.

(iii) A very thin coaxial cable end-processed structure produced using the very thin coaxial cable end-processing method according to the embodiment (1).

Points of the Invention

According to one embodiment of the invention, by cutting a circumferential portion of the exposed shield conductor in plural longitudinal portions of the very thin coaxial cable, the shield conductor is cut in any one of the end-processing portions. This can prevent the inner insulator from being damaged because of cutting the shield conductor positioned in the middle.

BRIEF DESCRIPTION OF THE DRAWINGS

The preferred embodiments according to the invention will be explained below referring to the drawings, wherein:

FIGS. 1A-1H are top views showing a process for processing an end of plural very thin coaxial cables according to the invention;

FIGS. 2A-2C are diagrams showing a principle of cutting shield conductors in FIGS. 1B and 1C;

DETAILED DESCRIPTION OF THE PREFERRED EMBODIMENTS

Below is described one embodiment according to the invention, referring to FIGS. 1A-1H and 2A-2C.

Figure 1E:
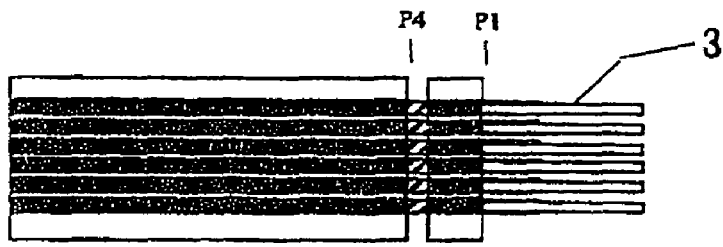

Referring to FIGS. 1A-1H, plural very thin coaxial cables 1 each have a center conductor 2, an inner insulator 3, a shield conductor 4, and a jacket 5 sequentially from the center to outer side. The shield conductor 4 is formed of either helically wound or braided conducting wire. As shown in FIGS. 1A-1H, a method for processing an end of the plural very thin coaxial cables 1 according to the invention includes: step S1 of, by laser scanning on both upper and lower surfaces, cutting the jacket 5 in plural end-processing portions, as indicated by P1, P2, and P3, to expose the shield conductors 4 as shown in FIG. 1B; step S2 of, by laser scanning on both the upper and lower surfaces, cutting the exposed shield conductors 4 positioned at laser-applied surfaces 8 without cutting shield conductors 7 of the shield conductors 4 positioned in spacing between adjacent very thin coaxial cables 1 as shown in the cross-sectional view at P1-P3 shown in FIG. 1C; step S3 of pulling and removing the jacket 5 and the shield conductors 4 at the end T from the farthest end-processing portion P1 from the end T, to expose the inner insulator 3 as shown in FIG. 1D; and step S4 of exposing the shield conductors 4 and center conductor 2 as shown in FIGS. 1E-1H.

In FIGS. 1A-1H, the end-processing portions P1, P2, and P3 are spaced at $1/6$ a shield conductor 4 helical or braid pitch.

FIGS. 2A-2C show cross-sectional structures at the end-processing portions P1, P2, and P3, respectively, in FIG. 1B. The end-processing portions P1, P2, and P3 are spaced at $1/6$ a shield conductor 4 helical or braid pitch. Since the shield conductors 4 are wound continuously, the shield conductors 4 of the very thin coaxial cables 1 are rotated through $1/6$ a period at each cross section of the end-processing portions P1, P2, and P3.

That is, in the end-processing portion P1, first portions 9 of the shield conductors 4 are exposed at laser-applied surfaces 8 (see FIG. 1C), and in the end-processing portion P2, second portions 10 of the shield conductors 4 are exposed at laser-applied surfaces 8, and in the end-processing portion P3, third portions 11 of the shield conductors 4 are exposed at laser-applied surfaces 8. The shield conductors 4 to be cut in the end-processing portion P1 are the first portions 9 of the shield conductors 4, and the shield conductors 4 to be cut in the end-processing portion P2 are the second portions 10 of the shield conductors 4, and the shield conductors 4 to be cut in the end-processing portion P3 are the third portions 11 of the shield conductors 4. Cutting each of the portions 9, 10 and 11 of the shield conductors 4 allows all the shield conductors 4 to be cut in any one of the end-processing portions P1, P2, and P3.

In the case of laser application to only one of the laser-applied surfaces 8, the shield conductors 4 can all be cut by spacing the end-processing portions P1, P2, and P3 at $1/3$ the pitch.

As above, the principle has been explained of cutting the shield conductors 4 by spacing the 3 end-processing portions P1, P2, and P3 at $1/6$ a shield conductor 4 helical or braid pitch, and applying laser light to both upper and lower surfaces of a very thin coaxial cable array.

In the case of n end-processing portions P1, P2, P3, . . . , Pn (n: integer, n≧2), the shield conductors 4 may be cut by spacing the n end-processing portions at $1/(2 \times n)$ a shield conductor 4 helical or braid pitch, and applying laser light to both upper and lower surfaces of the very thin coaxial cable array.

Also, in the case of m end-processing portions P1, P2, P3, . . . , Pm (m: integer, m≧2), the shield conductors 4 may be cut by spacing the m end-processing portions at $1/m$ a shield conductor 4 helical or braid pitch, and applying laser light to one surface of the very thin coaxial cable array.

Also, in this embodiment, the end-processing portions P1, P2, P3, . . . , Pn are formed separately, but may be joined. In that case, the distance from the end-processing portion P1 to Pn, i.e., the joined shield conductor exposure width is ½ a shield conductor 4 helical or braid pitch for shield conductor 4 cutting at both upper and lower surfaces of the very thin coaxial cable array, and 1 pitch for shield conductor 4 cutting at one surface.

Also, in this embodiment, for jacket 5 or shield conductor 4 cutting, laser light is used, but that method is not limited to laser light, and may use a cutting blade, for example.

EXAMPLES

The end-processing process is explained in detail.

As shown in FIG. 1A, plural very thin coaxial cables 1 are first arrayed at a desired array pitch, to form a flat cable. This flat cable formed by plural very thin coaxial cables 1 is laminated with adhesive tape 6. This causes the plural very thin coaxial cables 1 to be fixed in the arrayed state. The very thin coaxial cables 1 are a 0.2 mm-diameter AWG#46 cable, and shield conductors 4 comprise 20 0.02 mm-diameter conductors helically wound therearound, for example.

As shown in FIG. 1B, this is followed by laser application to jacket 5 formed of a polymer material in end-processing portions P1, P2, and P3 using a 10.6 μm-wavelength $CO_2$ laser. Laser energy applied is absorbed into the adhesive tape 6 and jacket 5, to make high-temperature, burn and evaporate them to cut holes in the adhesive tape 6 and jacket 5. The hole size can be adjusted by adjusting laser energy. The laser light of the $CO_2$ laser is reflected at surface of metal wires constituting the shield conductors 4, and therefore causes no damage to the shield conductors 4 or inner insulator 3.

The $CO_2$ laser is applied to both upper and lower surfaces of the very thin coaxial cables 1, to thereby cut the jacket 5 all around the very thin coaxial cables 1.

In this manner, laser is applied to the jacket 5, to thereby cut the jacket 5 to expose the shield conductors 4, to form exposed shield conductor portions 7. This FIG. 1B step is step S1. To expose the shield conductors 4, other jacket 5-cutting methods, such as dicing saw cutting, may be used.

By adjusting the $CO_2$ laser intensity, scanning speed, number of times of scanning, etc., the exposed shield conductor portion 7 width (in the longitudinal direction of the very thin coaxial cables 1) in the end-processing portions P1, P2, and P3 is set at 0.3 mm. It is desirable that the exposed shield conductor portion 7 width in the end-processing portions P1, P2, and P3 be not less than 0.1 mm, taking account of the $CO_2$ laser spot diameter and YAG laser cutting of the shield conductors 4 in the subsequent step.

As shown in FIG. 1C, this is followed by laser application to the shield conductors 4 at both the upper and lower sides of the very thin coaxial cables 1 in the end-processing portions P1, P2, and P3 using a 532 nm-wavelength YAG laser (second harmonics), to thereby cut the shield conductors 4 positioned at laser-applied surfaces 8 without cutting (but by weak laser intensity-scanning) of shield conductors 7 of the shield conductors 4 positioned in spacing between adjacent very thin coaxial cables 1. This FIG. 1C step is step S2.

Figure 3:
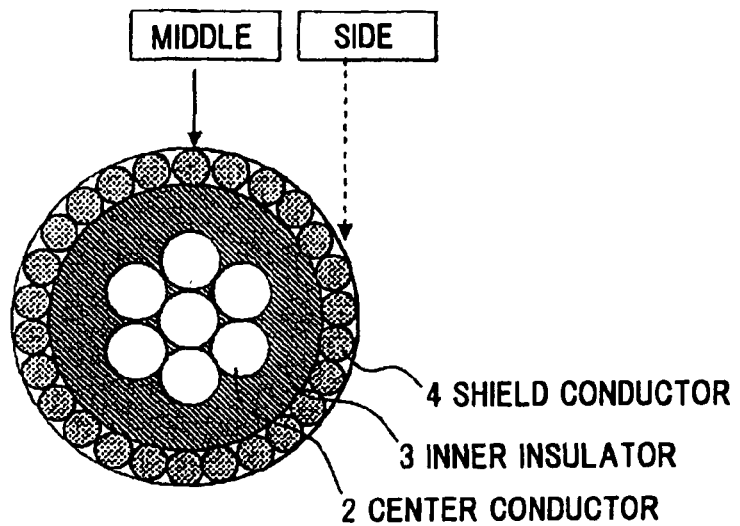
FIG. 3 is a cross sectional view showing an exposed portion of the shield conductors by stripping off a jacket of the very thin coaxial cables.

Here, as shown in FIG. 3, the exposed shield conductor portions 7 by removing the jacket 5 of the very thin coaxial cables 1 each have center conductor 2, inner insulator 3, and shield conductors 4 sequentially from the center to outer side. The conventional coaxial cable layer-removing method cuts all shield conductors positioned in the upper half and all shield conductors positioned in the lower half by laser scanning 2 times. This leads to an increase in the number of shield conductors to be cut by laser at sides of the coaxial cable, compared with the middle of the coaxial cable, and therefore requires an increase in laser intensity. This strong laser intensity-scanning for shield conductor cutting causes laser light to reach the inner insulator 3, and damage the inner insulator 3.

In contrast, in the present invention, the laser intensity is set in a manner that can cut shield conductors 4 positioned in the middle (approximately 50%-70% of laser intensity required for cutting shield conductors 4 positioned at sides), and laser light can therefore be prevented from reaching the inner insulator 3, and damaging the inner insulator 3. The shield conductors 4 cannot be cut at sides because of weak laser intensity thereat.

As shown in FIG. 1D, this is followed by pulling and removing the jacket 5 and the shield conductors 4 at the end T from the farthest end-processing portion P1 from the end T, to expose the inner insulator 3. In this case, in step S2, the plural shield conductors 4 have been cut in any one of the end-processing portions P1, P2, and P3. This FIG. 1D step is step S3.

Figure 4A:
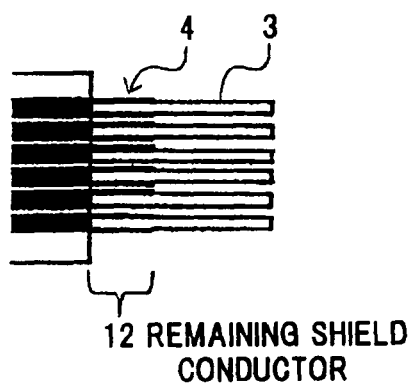
FIG. 4A is an enlarged view showing a remaining portion of the shield conductors in FIG. 1D.
Figure 4B:
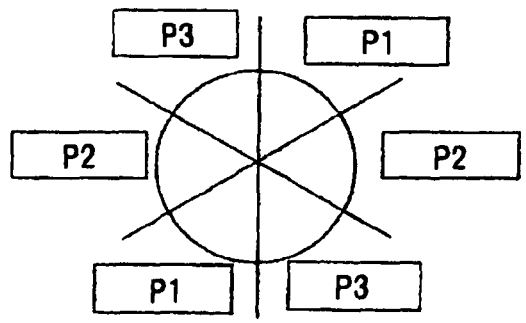
FIG. 4B is a schematic cross sectional view showing the remaining shield conductor portion.
Figure 5A:
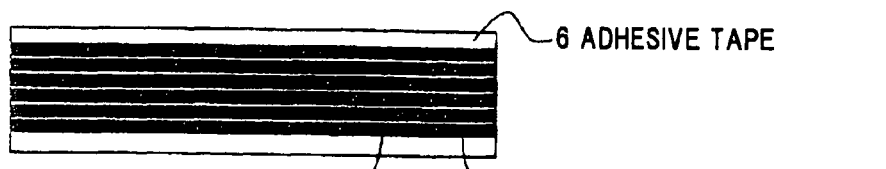
FIGS. 5A-5D are top views showing a conventional process for processing an end of plural very thin coaxial cables.
Figure 5B:
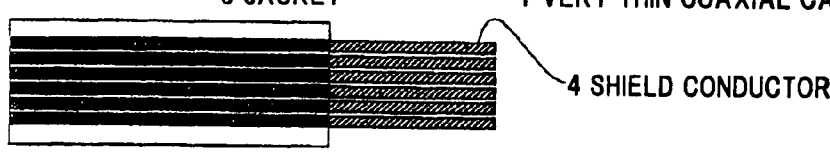
Figure 5C:
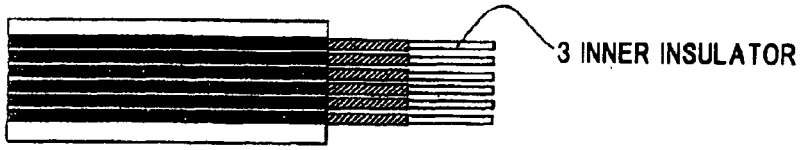
Figure 5D:
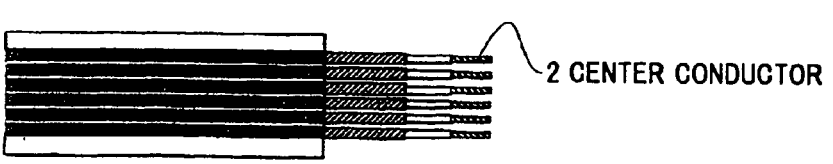

Here, portion of FIG. 1D is shown in FIG. 4A. In remaining shield conductor portion 12, the length of shield conductors 4 is of 3 kinds. That is, as defined in FIG. 4B, the circumference is divided into 6 zones: in the remaining shield conductor portion 12, there are 2 zones of 60 degrees of the circumference for shield conductors 4 with P1 end-processing portion length; 2 zones of 60 degrees of the circumference for shield conductors 4 with P2 end-processing portion length; and 2 zones of 60 degrees of the circumference for shield conductors 4 with P3 end-processing portion length.

Figure 1F:
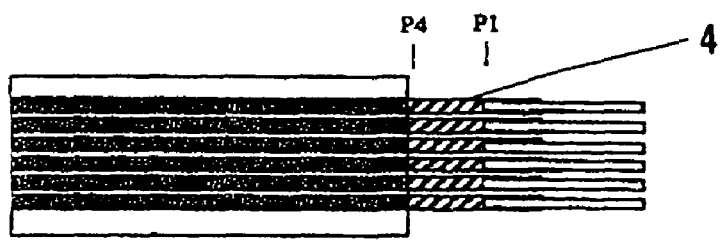

As shown in FIG. 1E, this is followed by applying laser to and thereby cutting the jacket 5 in end-processing portion P4 using a 10.6 μm-wavelength $CO_2$ laser, and subsequently pulling and removing the jacket 5 at the end T. As shown in FIG. 1F, shield conductors 4 between the end-processing portion P4 to P1 are exposed, to form exposed shield conductor 4 portions.

Figure 1G:
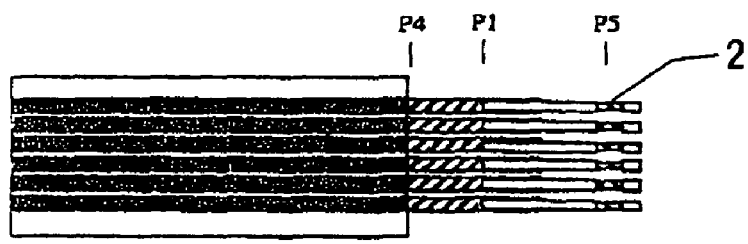
Figure 1H:
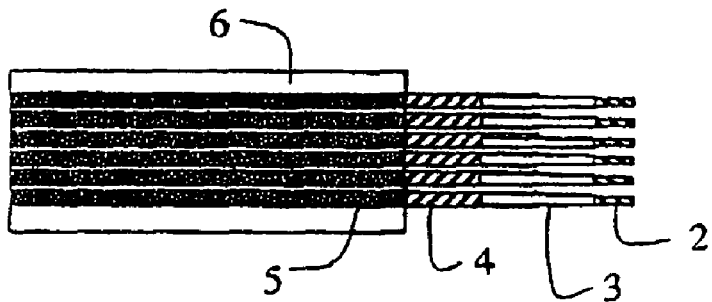

As shown in FIG. 1G this is followed by applying laser to and thereby cutting the inner insulators 3 in end-processing portion P5 using a 10.6 μm-wavelength $CO_2$ laser, and subsequently pulling and removing the inner insulators 3 at the end T, to form exposed center conductor 2 portions as shown in FIG. 1H.

This completes the end processing, resulting in the end-processed structure of the present invention. The FIG. 1E-1H steps are step S4.

In the case of n end-processing portions P1, P2, P3, ..., Pn (n: integer, n≧2), in the same manner as in the above example, in step S1, the n end-processing portions may be spaced at 1/(2×n) a shield conductor 4 helical or braid pitch. In step S2, this may be followed by laser application to both upper and lower surfaces of very thin coaxial cable array in the n end-processing portions P1, P2, P3, ..., Pn, to thereby cut the shield conductors 4. In step S3, this may be followed by pulling and removing the jacket 5 and the shield conductors 4 at the end T from the farthest end-processing portion P1 from the end T, to expose the inner insulator 3. In step S4, this may be followed by exposed shield conductor portion and exposed center conductor portion formation. The above example corresponds to the case of n=3. The advantages of the present invention can be achieved even in the cases of n=2 or 4 or more.

In this case, in the end-processing portions P1, P2, P3, ..., Pn, the number of shield conductors 4 to be cut in each of end-processing portions P1, P2, P3, ..., Pn is decreased with increasing n, and increasing n therefore allows a decrease in the YAG laser intensity for shield conductor 4 cutting. This allows a decrease in the YAG laser intensity which reaches the inner insulator 3, and therefore a more decrease in damage to the inner insulator 3.

Also, in the case of m end-processing portions P1, P2, P3, ..., Pm (m: integer, m≧2), the shield conductors 4 may be cut by spacing the m end-processing portions at 1/m a shield conductor 4 helical or braid pitch, and applying laser light to one surface of very thin coaxial cable array.

The method by applying laser to one surface at 2 positions (m=2) of coaxial cable array causes an increase in the number of shield conductors 4 to be cut by laser at sides of the coaxial cable in the same manner as in the conventional method, and therefore requires an increase in laser intensity. However, in the present invention, the inner insulator 3 is damaged in the longitudinal different portions (2 positions), whereas in the conventional method, the inner insulator 3 is damaged at 1 portion. For this reason, the present invention, which disperses damaged portion, can more reduce deterioration in shield performance than the conventional method.

The method by applying laser to one surface at 3 or more positions (m=3 or more) of coaxial cable array can prevent the inner insulator 3 from being damaged because the laser intensity is set in a manner that can cut shield conductors 4 positioned in the middle, as explained in FIG. 3.

Also, in the above example, the exposed shield conductor portions in the end-processing portions P1, P2, P3, ..., Pn are formed separately, but may be joined. In that case, the distance from the end-processing portion P1 to Pn, i.e., the joined shield conductor exposure length is ½ a shield conductor 4 helical or braid pitch for shield conductor 4 cutting at both upper and lower surfaces of very thin coaxial cable array, and 1 pitch for shield conductor 4 cutting at one surface. In this case, the laser-applied positions (shield conductor portions to be cut) are spaced at 1/(2×n) or 1/m the pitch.

Also, in the above example, for shield conductor 4 cutting, laser light is used, but that method is not limited to laser light, and may use a cutting blade, for example.

Although the invention has been described with respect to the above embodiment, the above embodiment is not intended to limit the appended claims. Also, it should be noted that not all the combinations of the features described in the above embodiment are essential to the means for solving the problems of the invention.

What is claimed is:

1. A method for processing an end of a very thin coaxial cable comprising sequentially from its center to outer side a center conductor, an inner insulator, a shield conductor formed of a helically wound or a braided conducting wire, and a jacket, said method comprising:

cutting the jacket to form a plurality of end processing portions along a longitudinal direction of the very thin coaxial cable, each of the end processing portions exposing the shield conductor;

cutting only a part of a circumferential portion of the exposed shield conductor in plural longitudinal portions of the very thin coaxial cable; and pulling and removing the jacket and the shield conductor between the end of the very thin coaxial cable and a farthest end-processing portion from the end of the very thin coaxial cable, to expose the inner insulator, wherein each of the end processing portions is cut on both upper and lower surfaces of the very thin coaxial cable at $1/(2 \times n)$ a helical or a braid pitch of the shield conductor, where n is an integer and $n \geq 2$.

2. The very thin coaxial cable end-processing method according to claim 1, wherein a width of the exposed shield conductor is not less than 0.1 mm.

3. The very thin coaxial cable end-processing method according to claim 1, wherein, after said cutting only the part of the circumferential portion of the exposed shield conductor, another part of the circumferential portion of the exposed shield conductor remains on the exposed shield conductor.

4. The very thin coaxial cable end-processing method according to claim 1, wherein each of the end processing portions includes a different exposed portion of the shield conductor.

5. A method for processing an end of a very thin coaxial cable comprising sequentially from its center to outer side a center conductor, an inner insulator, a shield conductor formed of a helically wound or a braided conducting wire, and a jacket, said method comprising:

cutting the jacket to form a plurality of end processing portions along a longitudinal direction of the very thin coaxial cable, each of the end processing portions exposing the shield conductor;

cutting only a part of a circumferential portion of the exposed shield conductor in plural longitudinal portions of the very thin coaxial cable; and pulling and removing the jacket and the shield conductor between the end of the very thin coaxial cable and a farthest end-processing portion from the end of the very thin coaxial cable, to expose the inner insulator, wherein each of the end processing portions is cut on one surface of the very thin coaxial cable at $1/m$ a helical or a braid pitch of the shield conductor, where m is an integer and $m \geq 2$.

6. The very thin coaxial cable end-processing method according to claim 5, wherein a width of the exposed shield conductor is not less than 0.1 mm.

7. The very thin coaxial cable end-processing method according to claim 5, wherein, after said cutting only the part of the circumferential portion of the exposed shield conductor, another part of the circumferential portion of the exposed shield conductor remains on the exposed shield conductor.

8. The very thin coaxial cable end-processing method according to claim 3, wherein each of the end processing portions includes a different exposed portion of the shield conductor.

* * * * *